US011838962B1

(12) United States Patent
Cornell

(10) Patent No.: US 11,838,962 B1
(45) Date of Patent: Dec. 5, 2023

(54) SYSTEM AND METHOD FOR GENERATING A CONNECTION

(71) Applicant: Peter Cornell, Beverly Hills, CA (US)

(72) Inventor: Peter Cornell, Beverly Hills, CA (US)

(*) Notice: Subject to any disclaimer, the term of this patent is extended or adjusted under 35 U.S.C. 154(b) by 98 days.

(21) Appl. No.: 17/395,047

(22) Filed: Aug. 5, 2021

Related U.S. Application Data

(60) Provisional application No. 63/061,496, filed on Aug. 5, 2020.

(51) Int. Cl.
*H04W 76/14* (2018.01)
*G06F 3/01* (2006.01)
*H04W 4/02* (2018.01)
*H04L 51/52* (2022.01)

(52) U.S. Cl.
CPC ............ *H04W 76/14* (2018.02); *G06F 3/017* (2013.01); *H04L 51/52* (2022.05); *H04W 4/02* (2013.01)

(58) Field of Classification Search
CPC ......... H04W 76/14; H04W 4/02; G06F 3/017; H04L 51/52

USPC ........................................................ 455/41.2
See application file for complete search history.

(56) References Cited

U.S. PATENT DOCUMENTS

| | | | |
|---|---|---|---|
| 2017/0034333 A1* | 2/2017 | Vishwanath | H04M 1/2757 |
| 2017/0238127 A1* | 8/2017 | Wilson | H04W 4/02 |
| | | | 455/41.2 |
| 2021/0042724 A1* | 2/2021 | Rathod | G07G 1/0054 |

OTHER PUBLICATIONS

Gesture Recognition, URL: https://en.wikipedia.org/w/index.php?title=Gesture_recognition&oldid=963635591, pp. 8, (Jun. 20, 2020).

* cited by examiner

*Primary Examiner* — Eugene Yun
(74) *Attorney, Agent, or Firm* — DLA PIPER LLP (US)

(57) ABSTRACT

Receiving, over a network, a connect request from a first computing device operated by a first user. The connect request comprises a description and/or image of the first user, information indicating the first user made a physical gesture to a second user to signal that a first user requests to connect with the second user, and first user location and time information relating to when the physical gesture was made.

20 Claims, 4 Drawing Sheets

SYSTEM AND METHOD FOR GENERATING A CONNECTION

CROSS REFERENCE PARAGRAPH

This application claims benefit of provisional application of U.S. Application No. 63/061,496, which was filed on Aug. 5, 2020, which is incorporated by reference in its entirety for all purposes.

The present disclosure relates to a system for generating connections for users in a social network system.

DETAILED DESCRIPTION OF THE DISCLOSURE

Figure 1:
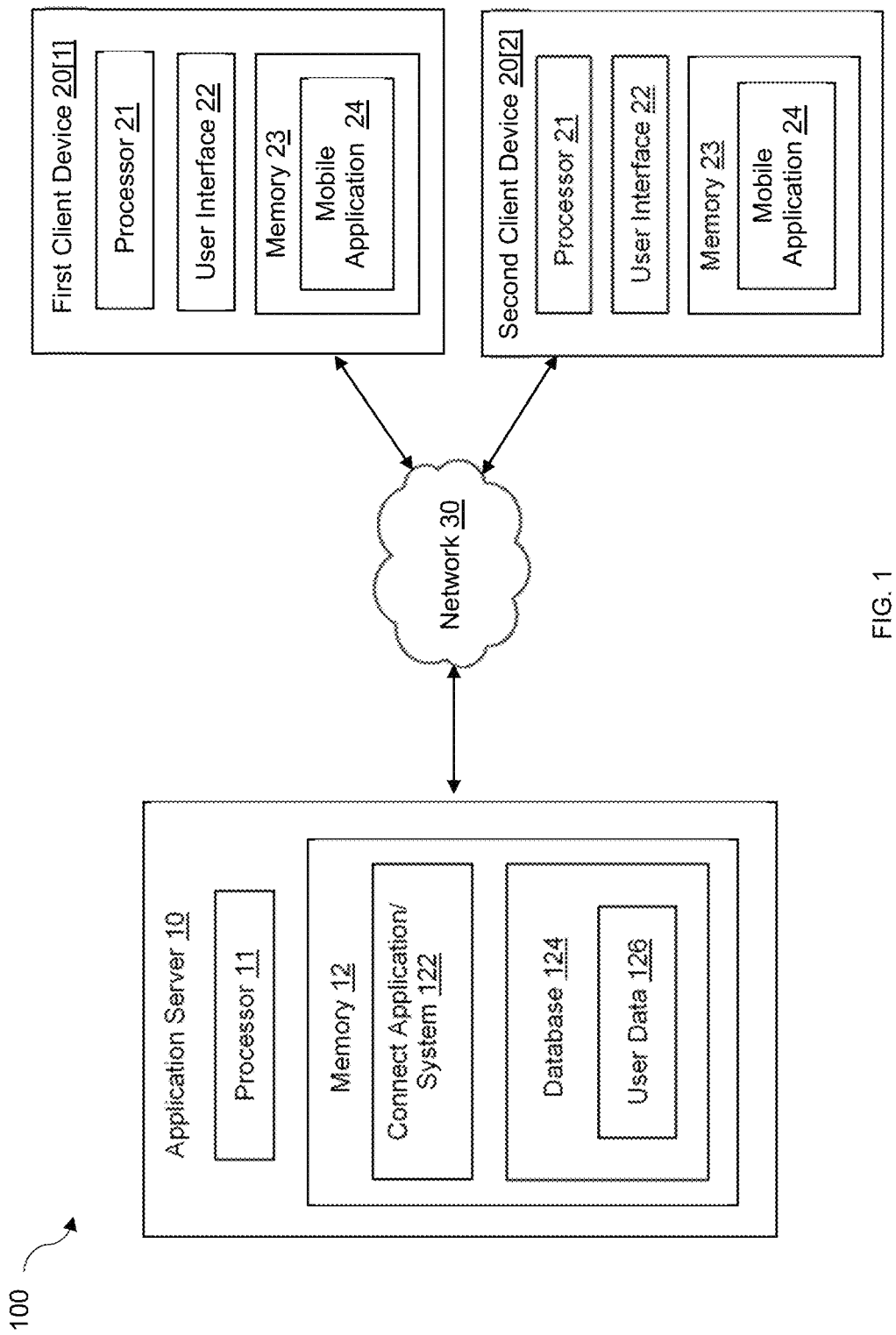
FIG. 1 illustrates a hardware structure of an example computing system in accordance with some embodiments of the present disclosure.

In accordance with some embodiments of the present disclosure, there is provided a computing system including a server executing a connect application in communication with a first computing device and a second computing device over a network. The server may include a processor and a memory storing the connect application user information. The executable instructions may be executed to cause the processor to receive a connect request from a first computing device comprising the connect application and operated by a first user over a network. The connect request may include a description and/or image of the first user and information which may indicate that the first user made a physical gesture to the second user. The physical gesture is made to signal that the first user is interested in connecting with the second user. The connect request may include information indicating first user location and time information relating to when the physical gesture was made. The executable instructions may be executed to cause the processor receive a connect request inquiry from a second computing device operated by a second user over the network. The connect request inquiry may include second user location and time information relating to when the physical gesture was made, and information indicating that the second user wishes to know more information about the connect request. The executable instructions may be executed to cause the processor to determine whether the first user location and time information match the second user location and time information. The executable instructions may be executed to cause the processor to: responsive to a determination that the first user location and time information coincides with the second user location and time information, and enable the second user to view the connect request from the first user to determine if the connect request was meant for the second user.

In some embodiments, the application server may accept a connect request answer from the second user. The connect request answer may include contact information for the second user, such as email, phone number, app username, AppChat username, Facebook, dating site, etc. The application server may send the connect request answer from the second user to the first user.

In some embodiments, upon receiving a request from the second user, the application server may allow the first user to communicate with the second user.

In some embodiments, the application server may enable the second user to view a profile associated with the first user.

In some embodiments, the application server may enable the second user to view social network information and/or dating network information associated with the first user.

In some embodiments, the social network information may include information from Facebook, Twitter, Instagram, or LinkedIn, or any combination thereof.

In some embodiments, the first user may not be notified that the second user has viewed the first user connect request until the second user engages with the first user.

In some embodiments, the first user may be notified that the second user has viewed the first user connect request.

In some embodiments, the connect request may be associated with the first user is removed after a predetermined period of time. The connect request may include a personal note from the first user to the second user. The location and time information may be displayed on the connect application as a pin. The physical gesture may be an ear tug, an L shape gesture made with a pointer finger and a thumb, a temple tap, or any other gesture, or any combination thereof.

The connect request answer from the second user may include an image of the second user. The second user may provide image information and/or name information to the connect application to see the name and/or image of the first user.

In some embodiments, the connect application may use the second user's device to confirm the second user's location and time information. The second user may make the connect request inquiry at or near a matched location. A time machine feature may be enabled.

In accordance with some embodiments of the present disclosure, there is provided a computing system including a server executing a connect application in communication with a first computing device over a network. The server may include a processor and a memory storing the connect application user information and executable instructions. The executable instructions may be executed to cause the processor to automatically open the connect application upon detection of a first user physical gesture made by a first user, and accept a connect request from the first user on the first computing device. The connect request may include a description and/or image of the first user and information which may indicate that the first user made a physical gesture to a second user to signal that the first user is interested in connecting with the second user. The connect request may include information indicating a first user location and time information relating to when the physical gesture was made.

In some aspects of the disclosure, a computing system can be provided, which can comprise a server executing a social media and/or dating application in communication with a first computing device over a network, the first computing device having a connect option installed. The server can comprise a processor and a memory storing the connect option user information and executable instructions. The executable instructions can cause the processor to perform operations comprising: automatically opening, by the social media and/or dating application, the connect option upon detection of a first user physical gesture made by a first user; accepting a connect request from the first user on the first computing device, the connect request comprising: a description and/or image of the first user, information indicating the first user made the first physical gesture to the second user to signal that the first user is interested in connecting with the second user, and first user location and time information relating to when the first physical gesture was made.

In some embodiments, the connect request from the first user may be automatically generated upon detection of the first user physical gesture or a first user additional physical gesture from the first user.

In some embodiments, the first user physical gesture and the first user additional physical gesture may be a same type of gesture.

In some embodiments, the first user physical gesture and the first user additional physical gesture may be a different type of gesture.

In some embodiments, the first user physical gesture and/or the first user additional physical gesture may be chosen by a connect application administrator and/or the first user.

In some embodiments, the connect application may generate the connect request on a social media platform associated with the first user.

In some embodiments, the connect application may accept changes and/or additions to the connect request from the first user.

In some embodiments, the executable instructions may be executed to cause the processor to receive a connect request inquiry from a second computing device operated by a second user over the network. The connect request inquiry may include second user location and time information relating to when the first physical gesture was made, and information indicating that the second user wishes to know more information about the connect request.

In some embodiments, the executable instructions may be executed to cause the processor to determine whether the first user location and time information match the second user location and time information. Responsive to a determination that the first user location and time information coincides with the second user location and time information, the executable instructions may be executed to cause the processor to enable the second user to view the connect request from the first user to determine if the connect request was meant for the second user.

In some embodiments, the executable instructions may be executed to cause the processor to open the connection application on a second computing device when a second user physical gesture is made by the second user.

In some embodiments, the first user physical gesture and the second user physical gesture may be a same type of gesture.

In some embodiments, the first user physical gesture and the second user physical gesture may be different types of gestures.

In some embodiments, the first user physical gesture and/or the second user physical gesture may be chosen by the first user and/or the second user.

In some embodiments, the connect application may accept changes and/or additions to the connect request inquiry from the second user.

In some embodiments, the connect request inquiry from the second user may be automatically generated upon detection of the second user physical gesture or a second user additional physical gesture from the second user.

In some embodiments, the second user physical gesture and the second user additional physical gesture may be a same type of gesture.

In some embodiments, the second user physical gesture and the second user additional physical gesture may be a different type of gesture.

In some embodiments, the second user physical gesture and/or the second user additional physical gesture may be chosen by a connect application administrator and/or the second user.

In some embodiments, the connect application may automatically generate the connect request inquiry on a social media platform and/or a dating platform associated with the second user.

Embodiments of the present disclosure describe techniques of utilizing a software application to generate connections for a plurality of users in social network system.

People have become less comfortable with face to face interactions and more so introductions due to the overwhelming connectivity to social media and mobile devices. To address these issues, some embodiments of present disclosure provide connection services on a connect application for users to initiate connections by using physical gestures made in physical locations where they meet. The connect application (e.g., connect app) may allow users to make a connection and see if it turns into communication at the choice of the "tagged" person.

For example, in some aspects of the disclosure, people that do not know each other can be connected. A first person can make a physical gesture to a second user to signal that he/she is interested in connecting with the second user. First user location and time information relating to when the physical gesture was made can be used to connect the first user to the second user.

For example, a man can see a woman at Whole Foods and wish to know whether she is interested in knowing more about him and/or meeting him in person. The man can make a physical gesture (e.g., pull his ear) to indicate to the woman that she can go to a connect app (e.g., called the EarTag app) on a smart phone to find a connect request from him. The connect request can have information pulled using the smart phone about the location and time when the physical gesture was made. For example, a pin can be put on the connect app indicating when and where the connect request was made. The connect request can also have a message from the man to the woman, such as: "Tall man in red hat wishes to meet woman with Lab dog" or "Tall man in red hat wishes to meet woman with Lab dog outside Whole Foods Saturday morning around 10:15 AM."

The woman can make a gesture back (e.g., an ear tug) to the man and/or the woman can go to the connect app on her smart phone and look for the connect request from the man. The woman can also put a pin on the connect app indicating when and where the man gestured to the woman and/or the woman can open the connect app and look for a connect request at the location and time the man gestured to the woman. The woman can submit a connect request response indicating that she wishes to connect with the man and/or wishes to know more information about the man.

The connect app can determine whether there are any matches for the location and time information that the man and woman have indicated. If there are any matches, the connect app will enable the woman to view the connect request from the man, and the woman can determine whether the connect request was meant for the woman. The woman can also determine whether she wishes to: connect with the man over the connect app; whether she wishes to know more about the man using info on the connect app; or wishes to connect with the man over a social media or dating app; or any combination thereof.

Some embodiments of the present disclosure may utilize a social network and/or dating application to automatically open a connect option for generating connections upon detection of a first user physical gesture made by a first user (e.g., initiator or "tagger") and accept a connect request from the first user on the first computing device. The social network and/or dating application may receive a connect request inquiry from a second computing device operated by a second user over the network. The connect request inquiry may indicate that the second user wishes to know more information about the connect request.

In some embodiments, the connect app may connect users who may frequently visit the same places, identify and showcase all users who are using the connect app to connect or "tag" other users. Since not everyone wants to be known to be on any given dating app, the connect app may help make a discreet connection. By utilizing the connect app or integrated social media platforms, the "tagged" activities may not be identified by others on the app and allow a connection for a user who happens to be attempting to make the connection with someone the user meets at a specific location. Accordingly, the disclosed principles may provide a practical technological solution to make connections while keeping effective social distancing among the users in the social network system.

FIG. 1 illustrates an example computing system 100 configured to connect different social network accounts together to produce payment method probabilities and generate payment screen predictions. As illustrated, system 100 may include an application server 10 (e.g., a server computing device), one or more user computing devices 20 (e.g., computing devices or user devices each operated by a user). Application server 10 may include a processor 11, a memory 12 and a communication interface (not shown) for enabling communication between different computing devices over network 30. Application server 10 may be in communication with a plurality of computing devices 20 operated by users within a cloud-based or hosted environment over the network 30. For example, communication between the computing devices may be facilitated by one or more application programming interfaces (APIs). Network 30 may be the Internet or other public or private networks or combinations thereof.

Application server 10 may include one or more online applications including a connect application 122, a database 124, and other program modules which may be implemented in the context of computer-executable instructions and executed by application server 10. The one or more online applications may be executed by processor 11 for providing one or more computer-hosted services and/or providing websites with particular services for a user to visit via a browser running on a user computing device 20. Application server may host a social media platform with connect application 122 to provide online connection services for a plurality of users. A user may access an online connect service via a web browser or a mobile application 24 stored on a user mobile device 20. The online connect service may be any network 30 accessible service that may provide connection support for a plurality of users. As illustrated in FIG. 1, application server 10 is depicted as a single device for ease of illustration, but those of ordinary skill in the art will appreciate that application server 10 may be embodied in different forms for different implementations. For example, application server 10 may include a plurality of servers communicating with each other through network 30. Alternatively, the operations performed by application server 10 may be performed on a single server.

The connect application 122 or connect system 122 may be linked to or communicate with one or more social networks, social media and/or dating applications such as Facebook, Twitter, Instagram, or Linked In, Tinder, Match, eHarmony, Grindr, or any other social network/social media/dating application/etc., or any combination thereof. The connect application 122 may receive the social network information including information from any of these entities, or other similar entities, or any combination thereof.

User computing devices 20 operated by a user may be any device configured to present user interfaces and receive inputs thereto. Each computing device 20[1] or 20[2] may be a smartphone, a personal computer, a tablet, a laptop computer, a personal digital assistant (PDA), or any computing system. A user may access the subscribed connect application provided by or hosted on application server 10 to perform social connection activities using a browser application through a computing device 20 or a mobile application 24 through a mobile device 20 operated by a user. A single user may have multiple computing devices 20, such as mobile phone, tablet, a smartphone, a personal computer, a tablet, a laptop computer, a personal digital assistant (PDA), or any computing system.

A user may create an account and subscribe to the connect application 122 provided by application server 10 or hosted on application server 10 in an online cloud computing environment. Each user account information or user profile may be stored as user data 126 in database 124. User data 126 may include user name, user identifier (ID), email address, phone number, the connect application user information, or other user account information to access to other social network websites (e.g., app username, AppChat username, Facebook, dating site).

Database 124 may be coupled to or in communication with the application server 10 via network 30. Database 124 may store user data 126, user connection data, and other data. Database 124 may receive instructions or data from and send data to application server 10. In some embodiments, the database 124 may be a shared remote database, a cloud database, or an on-site central database. In some embodiments, application server 10 may retrieve and aggregate a third party user data by accessing a social network or database via network 30. In one embodiment, application server 10 may store the retrieved user data 126 in database 124 for a predetermined period of time. User behavior data may include communication data between two or more users interacted with application server 10 through corresponding computing devices 20. User behavior data may be used for the connect application 122.

Figure 2:
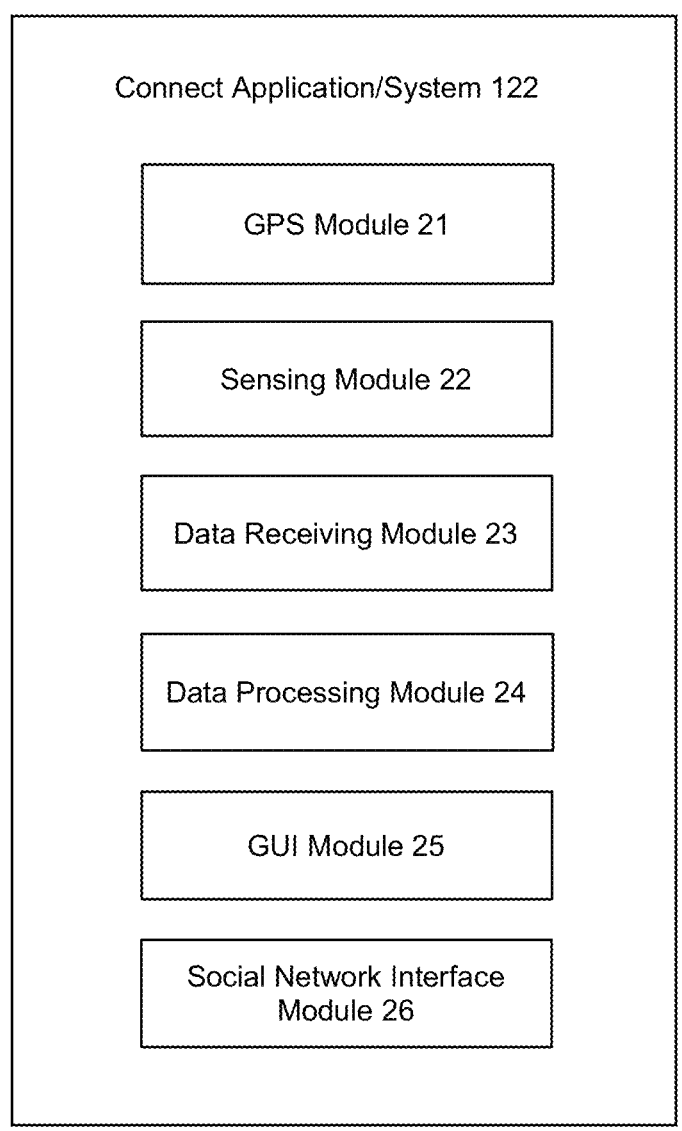
FIG. 2 illustrates an example functional diagram of a connect system according to some embodiments of the present disclosure.

FIG. 2 illustrates an example functional diagram of a connect system/application according to some embodiments of the present disclosure. A plurality of modules may be constructed to facilitate a plurality of user connection or communication data with the connection system/application 122. The connection system/application 122 hosted on application server 10 may include a Global Positioning System (GPS) module 21, sensing module 22, data receiving module 23, data processing module 24, GUI module 25, and social network interface module 26. GPS module 21 may be executed to present a geographical map-based interactive user interface on a display of a user computing device 20 for a user to search or mark a location. GPS module 21 may be configured to identify and/or receive location and time that user activities happen. Sensing module 22 may be configured to detect user gestures. Data receiving module 23 and data processing module 24 may be configured to receive and process information or requests from the user computing devices 20 operated by users. GUI module 25 may be configured to present graphical user interfaces to receive user information and requests. Social network interface module 26 may be configured to link the connect app 122 to the social network website.

Users may use and choose a plurality of different gestures to initiate connect request to build connections between users in a social network system, such as, but not limited to::
1) Touching nose with finger
2) Touching ear with finger
3) Tugging ear with finger and thumb
4) Touching side of eye with finger
5) Touching temple with finger or fingers
6) Touching forehead with finger
7) Touching top of head with finger or hand
8) Intertwining the index and middle finger from a "peace sign" (think "peace" to "fingers crossed")
9) Bringing the index finger and middle finger together (think cutting gesture but pointed up)
10) Making a circle with your hand, thumb tip touches index tip and other 3 fingers are aligned with the index finger
11) Closed fist with thumb on top, to a thumbs up
12) Horn gesture with the index and pinky finger extended, thumb holding down the middle and ring finger;
13) Circles in air with index finger
14) L with the right hand
15) Index finger and middle finger pointed to eyes, or
16) Index finger and middle finger pointed to eyes, then 180 degrees pointing to another person, or
17) Any combination of the above.

Figure 3:
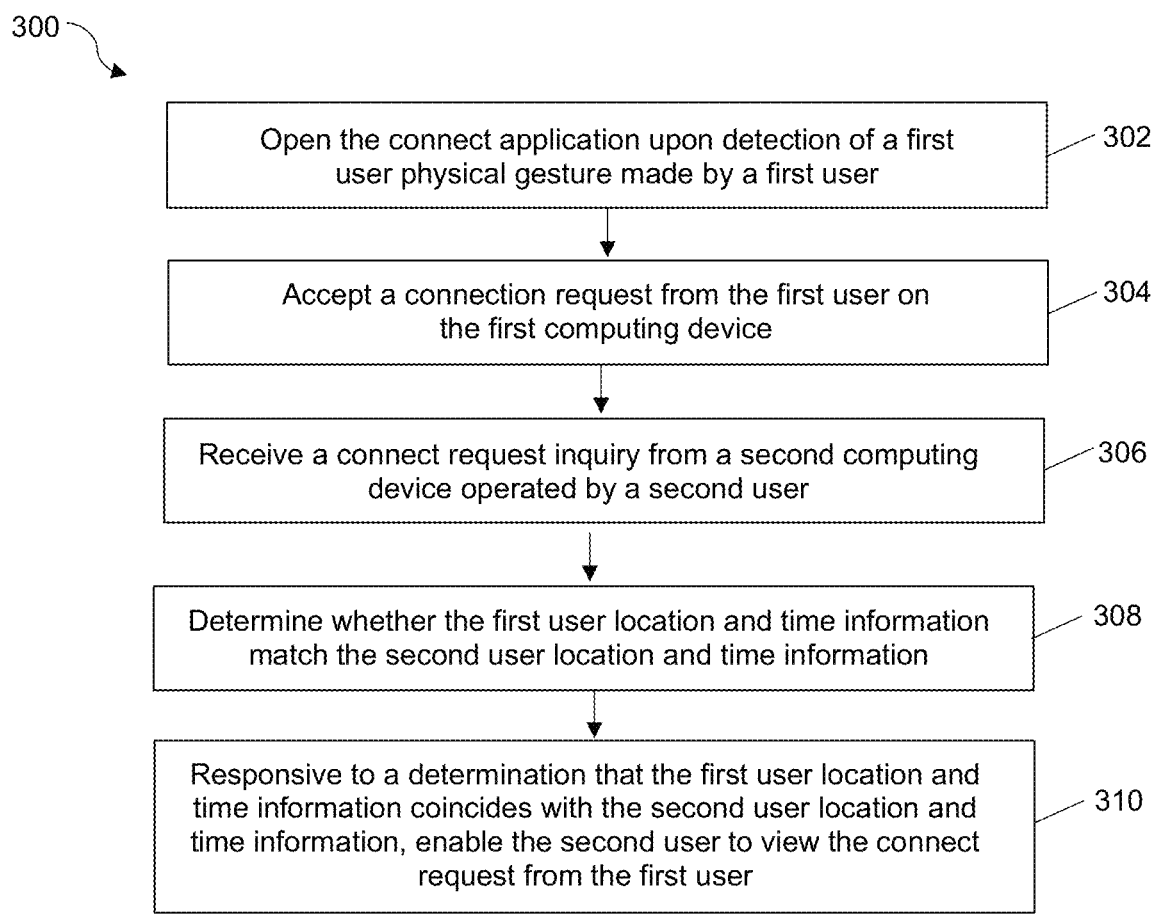
FIG. 3 is a flowchart illustrating an example process to provide connection services in accordance with some embodiments of the present disclosure.

FIG. 3 is a flowchart illustrating an example process 300 to perform connection services to a plurality of users in a social network in accordance with some embodiments of the present disclosure. The process 300 may be configured as computer programs (e.g., connect application 122) executed on one or more computing devices, in which the systems, model components, processes, and embodiments described in the present disclosure can be implemented. Thus, the described operations may be performed with computer-executable instructions under control of one or more processors. The order in which the operations are described is not intended to be construed as a limitation, and any number of the described operations can be combined in any order and/or in parallel to implement the process.

At step 302, the application server 10 may execute a connect application 122 in communication with a first computing and automatically open the connect application upon detection of a first user physical device 20 gesture made by a first user. The first computing device 20 may store the connect application 122 and be operated by a first user over a network. In some embodiments, the application server 10 may automatically open a connect option by the social media and/or dating application, upon detection of a first user physical gesture made by a first user.

At step 304, the connect application may be executed to accept a connect request from the first user via a first user computing device. The connect request may include a description and/or image of the first user, and information which may indicate that the first user made a first physical gesture to the second user. The first physical gesture may be made by the first user to signal that the first user is interested in connecting with the second user, and first user location and time information relating to when the physical gesture was made. The connect application may automatically be opened upon detection of a first user physical gesture made by a first user operating the first computer device 20. The physical gesture to open the connect application may be same as or different from the one the first user makes to the second gesture. The connect application may automatically identify the first physical gesture associated with a GPS location information of the first user device when the first physical gesture was made. The first user may access a geographical map-based user interface presented by the connect application to search and mark a location (e.g., a first user location) or the time information when the physical gesture was made later after the first user has left the first user location. The first user may leave a "tag", and/or generate a profile including a "Tag Line," a social media link, a thumbnail picture, etc. The "Tag Line" may include a description of the first user, and information which indicates that the first user made a first physical gesture to the second user, etc. A user may access the connect application and edit the user profile by adding messages and marking the time and one or more places where the user has been. The user may define how long the message remains in the connection application.

In various embodiments, the connect request from the first user is automatically generated upon detection of the first user physical gesture or a first user additional physical gesture from the first user. The first user physical gesture and the first user additional physical gesture can be a same type of gesture or the first user physical gesture and the first user additional physical gesture can be different types of gestures. The first user physical gesture and/or the first user additional physical gesture can be chosen by a connect application administrator and/or the first user. In some embodiments, the connect application can generate the connect request on a social media platform associated with the first user. In some embodiments, the connect application can accept changes and/or additions to the connect request from the first user.

At step 306, the application server 10 may receive a connect request inquiry from a second computing device operated by a second user over the network. The connect request inquiry may include second user location and time information relating to when the physical gesture was made, and information indicating that the second user wishes to know more information about the connect request.

At step 308, the application server 10 may determine whether the first user location and time information match the second user location and time information. The connect application may present the connect request to the first user and the second user when a matched location is located an intersection of the first location and the second user location. The matched location (e.g., a Tag Spot or Tag Spot Area) may be within a predetermined radius of the intersection.

At step 310, responsive to a determination that the first user location and time information coincides with the second user location and time information, the application server 10 may enable the second user to view the connect request from the first user to determine if the connect request was meant for the second user. In some embodiments, the connection application may be opened on a second computing device when a second user physical gesture is made by the second user. The connect request inquiry from the second user is automatically generated upon detection of the second user physical gesture or a second user additional physical gesture from the second user.

In various embodiments, the first user physical gesture and the second user physical gesture may be a same type of gesture. The first user physical gesture and the second user physical gesture may be different types of gestures. The first user physical gesture and/or the second user physical gesture may be chosen by the first user and/or the second user. The connect request inquiry from the second user may be automatically generated upon detection of the second user physical gesture or a second user additional physical gesture from the second user. The second user physical gesture and the second user additional physical gesture may be a same type of gesture or the second user physical gesture and the second user additional physical gesture may be a different type of gesture. The second user physical gesture and/or the second user additional physical gesture may be chosen by a connect application administrator and/or the second user. The connect application automatically may generate the connect request inquiry on a social media platform and/or a dating platform associated with the second user.

In some embodiments, the application server 10 may accept a connect request answer from the second user. The connect request answer may include contact information for the second user, such as email, phone number, app username, AppChat username, Facebook, dating site, etc. The application server 10 may send the connect request answer from the second user to the first user.

In some embodiments, upon receiving a connect request inquiry from the second user, the application server 10 may allow the first user to communicate with the second user. The application server 10 may enable the second user to view social network information and/or dating network information associated with the first user.

In some embodiments, the social network information includes information from Facebook, Twitter, Instagram, or Linked In, or any combination thereof.

In some embodiments, the first user may not be notified that the second user has viewed the first user connect request until the second user engages with the first user. The first user may be notified that the second user has viewed the first user connect request.

In some embodiments, the connect request made by the first user may be removed after a predetermined period of time. The predetermined period of time may be defined by the first user. The connect request made by the first user may be removed automatically after the connection is established. The connect request may comprise a personal note from the first user to the second user. For example, the personal note may be simple description of the users such as "a Tall guy in black hat "ear tugged" girl in pink striped mask and white dress at Whole Foods at Noon on Saturday." The personal note may be the only identifying information for the first user. The message may indicate that "ME ear tugged YOU" with the following descriptions:

ME: Tall man, brown hat, red shirt: YOU: Blond woman, white dress, red shoes. agree to share Facebook In some embodiments, the connect request answer may include an image of the second user. The second user may provide image information and/or name information to the connect application to see the name and/or image of the first user. The second user may make the connect request inquiry at or near a matched location.

In some embodiments, the connect application may use the second user's device to confirm the second user's location and time information.

A time machine feature may be enabled. For example, the second user (e.g., a girl) may operate a second computing device to initiate the connect app if the second user remembered someone ear tugged her 2 weeks ago or indefinitely. The second user may have to authenticate that she were there; or next time that she went to that location, she may confirm she was there on the connect app. This may help avoid people who are misusing the app.

In some embodiments, a connection example described in process 300 may be validated and deployed into a practical application in a server-client computing environment of system 100. For example, the connect system/application 122 may be installed onto the user computing devices associated with a plurality of users to utilize connect services through a social network platform. The connect system/application 122 may be integrated with the platform to provide various graphical user interfaces displayed on a user interface of a computing device 140 when a user is interacting with the online social network platform over the network 30.

A connect app and/or social media feature may enable strangers who are at the same physical location, discreetly connect if desired on the app or social media feature via the initiator or "tagger" making a physical gesture (giving a gentle tug of the ear lobe, showing a peace sign then closing the fingers to be 1 from the 2, etc.), leaving or sending a token, or verbally informing the "tagged" which indicates they would like the other to connect on the app or the social media feature.

For example, John is sitting at a restaurant for a business dinner and sees a girl (who we will call Jane), across the room who he locks eyes with, and they continue to catch one another's eye throughout their respective meals. The girl is eating with her family, and rather than having John interrupt the girl's dinner, or creating an awkward situation, he gently tugs his ear lobe when they make eye contact yet again at the restaurant, indicating that she has been "tagged". John goes to the connect app integrated social media platform of choice to send a connect request, and verifies his current location at the restaurant (e.g., Uber location for pick up) where it will remain for 24 hours. John can also mark his location later after he has left, and he leaves his "tag", or a profile/thumbnail picture. Jane can go to the connect app integrated social media platform anytime and either mark her location there at the restaurant while she is there or she can mark her location at the restaurant later once she has left. Once she has marked the location, John's profile picture may come up, and a "Tag Line", such as "Beautiful girl wearing a red dress eating with her family", or "Red dress drinking red wine". etc. Once identified, Jane may click on John's profile on the connect app or integrated social media platform(s) discreetly before ultimately deciding to engage in conversation or not.

John may never know Jane looked for him on the app or feature unless Jane ultimately decided to engage him. John's "Tag" gets deleted from the app after 24 hours, without a trace. Once Jane initiates contact in under 24 hours, John's tag gets deleted from the app immediately.

In various scenarios, the connection may be used in many situations and environments. For example, a connect application or other application can be used to connect with and/or find contact information for a person(s) a user sees at a place the user has been, such as, but not limited to, a concert, a bar, a gas station, or a store. As an additional example, a person may see someone in a car while they drive by, and one person (e.g., a driver or a pedestrian) can make a gesture (e.g., "ear tag") to another person (who is in a car or on the street). In this example, the intersection (or a predetermined area near the intersection, e.g., a 0.5 mile radius) where the gesture was made may serve as a Tag Spot or Tag Spot Area. In some aspects of the disclosure, a person looking to connect (e.g., the instigator and/or the replying party) may need to have a GPS or location tracking information on their device (e.g., WIKI) indicating that they have been at the Tag Spot or Tag Spot Area. In some aspects, a person looking to connect (e.g., the instigator and/or the replying party) can send an image or other description information (e.g., "tall man in white hat wants to connect with girl in pink dress with puppy at Whole Foods on Jul. 7, 2020") proving that the person was at the Tag Spot or Tag Spot Area.

In some embodiments, the gesture may use a "tag" only on another app or web site, such as a social media app (e.g., Instagram, Facebook, etc.) where a person could "Add Location" of where they currently are or were to a post of any sort, and/or "Tag" the location (e.g., a restaurant) so that the "tagger" may search by location and/or business or place to see if the "tagged" person posted on social media so the "tagger" can initiate contact with the other person.

Aspects of the present disclosure may establish a computer-implemented system and method to connect services for a large amount of users in various social network systems. By utilizing an application (e.g., connect app, social media app or website, other app or web site), strangers can connect discreetly after seeing one another in person, and after one, or both people, give or receive an initiating gesture/invite (e.g., called Gestvite in some embodiments, although many other names can be used) to indicate they can connect on an app.

In some aspects, the initiating gesture/invite (Gestvite) can be recognized by a capable mobile device to take the user directly to the connect app or other app (e.g., social media app) (opening the app) where they can choose whether to leave a "tag" or search for one. The "tag" can be accessed traditionally as well if a mobile device isn't capable of processing the "Gestvite", or, the user would like to open the app discreetly.

In some aspects of the disclosure, one or both of the strangers can "tag" or identify themselves on the connect app or a social media app at their current location or at a point later in time to have a conversation initiated. The "tag" can be a "tagline", and/or a user's picture set for the connect app. Social media links can be presented as well. Once the connection has been established, the identifying "tag" or "tags" from one or both strangers can disappear from the connect app or other app. If the connection isn't established, the user can choose when the "tag" will disappear.

In some aspects of the disclosure, people can check the connect app or other app (e.g., social media app) for missed connections at a place they frequent or have visited, with or without receiving a gesture/invite (Gestvite), which may be based on other users opting to let their "tag" remain at the particular location. For example, if a person doesn't have time to make a gesture, or doesn't think another person saw their gesture, a message can be posted that the other person can see. (Thus, a gesture doesn't need to be made in some aspects.) A person can search places she's been, or she can list places she's been. "Taggers" can choose how long a message remains. The message can be non-identifying except for descriptive details about the persons and the location (e.g., tall guy in black hat wants to meet girl with puppy in outside Whole Foods store on Sunday afternoon).

In some aspects of the disclosure, users can send videos to each other using their computing devices and the connect app and/or another app (e.g., a social media app, a dating app). In addition, the users can send videos and/or video call one another (e.g., using the connect app and/or another app) as a means of communication after connecting if they choose. In addition, after connecting (e.g., using the connect app or another app), the users can continue to keep communicating on the app they used to connect (e.g., the connect app or another app) or via another app or platform (e.g., a social media platform or a dating platform) once respectively connected.

An example algorithm for connecting users, according to embodiments of the present disclosure, is as follows:

*Accepting system instructions: For example, accept instructions (e.g., from a system administrator and/or a first user) relating to required and optional information for connect request and required and optional information for connect request inquiry; accept instructions (e.g., from an administrator and/or a first user) regarding whether and when the first user is notified when the second user has viewed a connect request; accept instructions (e.g., from an administrator and/or a first user) regarding when a connect request is to be deleted; accept instructions regarding distance and/or time parameters; or accept any instructions regarding what gestures are recognized and what meaning they have; or any combination thereof.

*Generate a connect request on the connect app or other app/system. The connect request may include: first user identifying information (e.g., a picture, a physical description (6 foot tall Caucasian man with brown hair and brown eyes), contact information, real name information, alias name information), first user location information when physical gesture to second user was made, time information (e.g., date and time information) relating to when the physical gesture to the second user was made, or optional information (e.g., custom message such as TALL MAN IN RED HAT WANTS TO CONNECT WITH GIRL IN GREEN DRESS, other information), or any combination thereof. The connect app and/or the connect request may be opened/generated by the first user using one or more gestures.

*Generate a connect request inquiry on the connect app or other app/system. The connect request inquiry may include: second user identifying information (e.g., a picture, a physical description, contact information, real name information, alias name information), second user location information relating to when physical gesture was made by first user, time information relating to when the physical gesture to the second user was made, or information indicating that the second user wishes to know more information about the connect request (e.g., a custom note, a symbol, a word indicating the second user would like to know the real identification of the first user, would like to know more about the first user, or would like to meet the first user, or would like to connect through the connect app or another app), or any combination thereof. The connect app and/or the connect request inquiry may be opened/generated by the second user using one or more gestures.

*Search connect requests on the connect app or other app/system to see if there are any connect requests that have GPS and time information that matches the connect request inquiry within a certain pre-set distance/radius (e.g., within ¼ mile) and a certain pre-set time (e.g., 15 minutes).

*If only one match is found, display on the connect app or other app/system the first user identifying information of the matching connect request and/or any custom message to the second user and allow the second user to accept the connect request. (Additional information may also be shown.) If more than one match is found, allow the second user to view first user identifying information and/or custom messages for any matching connect requests to determine if any connect requests were meant for the second user and accept that request(s).

*Notifying the first user when the second user has viewed the connect request in accordance with system parameters.

*Accepting a communication request and a from the second user allowing communication with the first user after the second user chooses a match. The communication can be on the connect app or other app/system. The communication request may be initiated by a gesture.

*Removing the connect request after a predetermined period of time in accordance with system parameters.

Systems and methods of performing gesture recognitions are presented in the Wikipedia.org article entitled "Gesture recognition", (URL: https://en.wikipedia.org/w/index/php?title=Gesture_recognition&oldid=963635591 as edited on Jun. 20, 2020 at 22:39 UTC) which is hereby incorporated by reference in its entirety.

Figure 4:
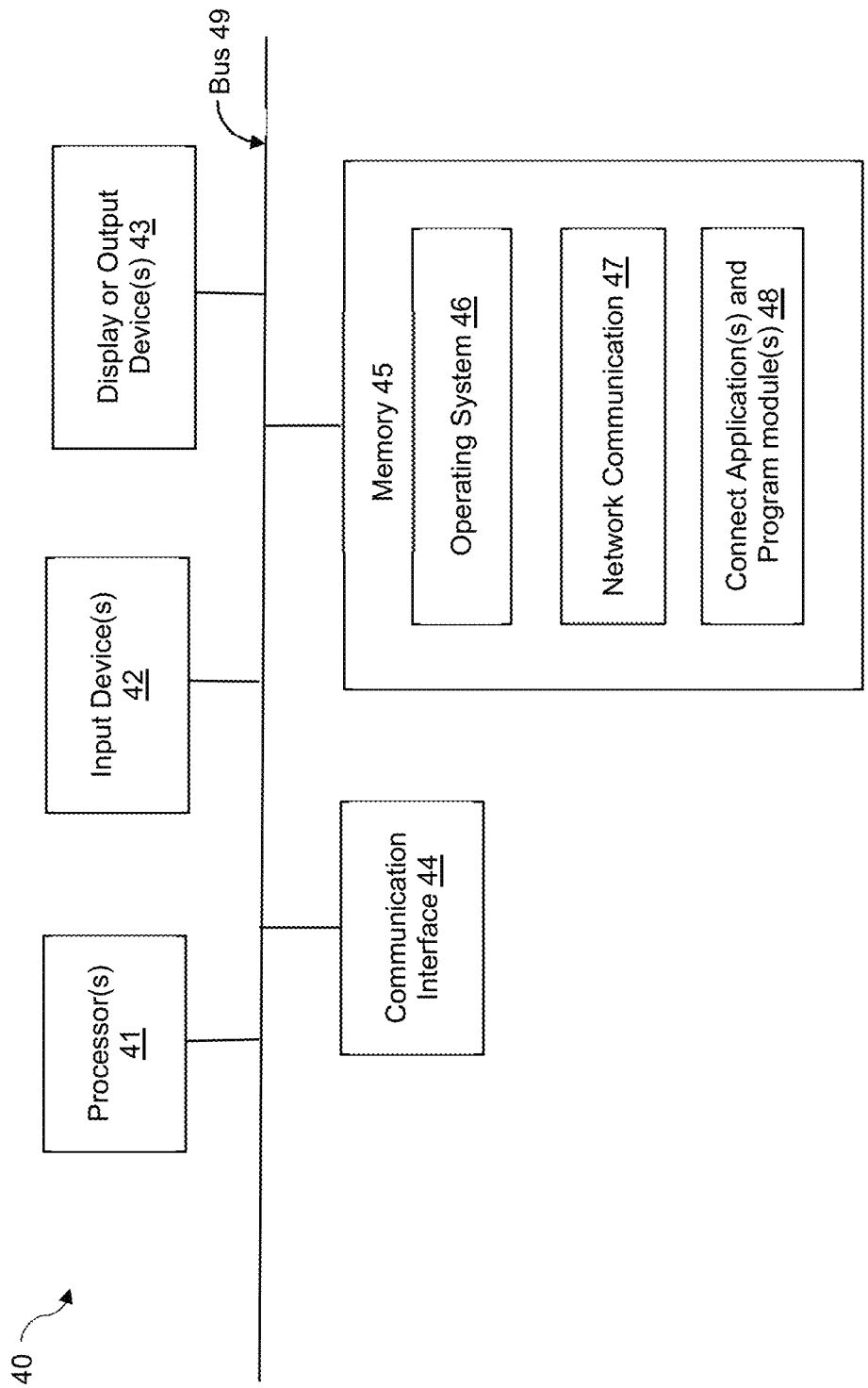
FIG. 4 is a block diagram of an example computing device in accordance with some embodiments of the present disclosure.

FIG. 4 is a block diagram of an example computing device 400 that may be utilized to execute embodiments to implement processes including various features and functional operations as described herein. For example, computing device 400 may function as application server 10, computing devices 20 or combination thereof in some embodiments. The computing device 400 may be implemented on any electronic device to execute software applications derived from program instructions for the connect application/system 122 of FIG. 1. The computing device 400 may include but is not limited to personal computers, servers, smart phones, media players, electronic tablets, game consoles, mobile devices, email devices, etc. In some implementations, the computing device 400 may include one or more processors 51, one or more input devices 42, one or more display or output devices 43, one or more communication interfaces 44, and memory 45. Each of these components may be coupled by bus 40, or in the case of distributed computer systems, one or more of these components may be located remotely and accessed via a network.

Processor(s) 41 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more non-transitory computer-readable storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 42 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 43 such as a CRT (cathode ray tube) or LCD (liquid crystal display) monitor for displaying information to the user and a keyboard and a pointing device such as a mouse or a trackball by which the user can provide input to the computer. Display device 43 may be any known display technology, including but not limited to display devices using Liquid Crystal Display (LCD) or Light Emitting Diode (LED) technology.

Communication interfaces 44 may be configured to enable computing device 300 to communicate with other computing or network device across a network, such as via a wired connection, a wireless connection, or a combination of wired and wireless connections. For example, communication interfaces 44 may include an Ethernet interface, an optical interface, a coaxial interface, an infrared interface, a radio frequency (RF) interface, a universal serial bus (USB) interface, a Wi-Fi interface, a cellular network interface, or the like.

Memory 45 may be any computer-readable medium that participates in providing computer program instructions and data to processor(s) 41 for execution, including without limitation, non-volatile storage media (e.g., optical disks, magnetic disks, flash drives, etc.), or volatile storage media (e.g., SDRAM, ROM, etc.). Memory 45 may include various non-transitory computer-readable instructions for implementing an operating system 46 (e.g., Mac OS®, Windows®, Linux), network communication 47, and application(s) and program modules 1116, etc. one program module may be a connect system 48. The operating system may be multi-user, multiprocessing, multitasking, multi-threading, real-time, and the like. The operating system may perform basic tasks, including but not limited to: recognizing input from input device 42; sending output to display device 43; keeping track of files and directories on memory 45; controlling peripheral devices (e.g., disk drives, printers, etc.) which can be controlled directly or through an I/O controller; and managing traffic on bus 49. Bus 49 may be any known internal or external bus technology, including but not limited to ISA, EISA, PCI, PCI Express, NuBus, USB, Serial ATA or FireWire.

Network communications instructions 47 may establish and maintain network connections (e.g., software applications for implementing communication protocols, such as TCP/IP, HTTP, Ethernet, telephony, etc.).

Application(s) and program modules 48 may include software application(s) and different functional program modules which may be executed by processor(s) 41 to implement the processes described herein and/or other processes. The program modules may include but not limited to software programs, objects, components, data structures that may be configured to perform particular tasks or implement particular data types. The processes described herein may also be implemented in operating system 46.

Communication between various network and computing devices may be facilitated by one or more application programming interfaces (APIs). APIs of system 400 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program may be a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter. For example, the steps and/or limitations in the specification, drawings, and/or claims may be performed in an order other than the order set forth in the specification, drawings, and/or claims.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computing system, comprising:
a server executing a connect application in communication with a first computing device and a second computing device over a network, the first computing device and the second computing device each having the connect application installed,
the server comprising:
a processor; and
a memory storing a connect application user information and executable instructions that cause the processor to perform operations comprising:
receiving, over a network, a connect request from a first computing device operated by a first user, wherein the connect request comprises: a description of a physical encounter and/or image of the first user, information indicating the first user made a physical hand signal to a second user to signal that a first user requests to connect with the second user, and first user location and time information relating to when the physical hand signal was made;
receiving, over the network, a connect request inquiry from a second computing device operated by a second user, the connect request inquiry comprising: a second user location and time information relating to when the physical hand signal was made, and information indicating that a second user requests information about the connect request;
determining whether the first user location and time information match the second user location and time information; and
responsive to a determination that the first user location and time information coincides with the second user location and time information, enabling the second user to view the connect request from the first user to determine if the connect request was meant for the second user.

2. The computing system of claim 1, comprising:
accepting a connect request answer from the second user, the connect request answer
comprising contact information for the second user; and
sending the connect request answer from the second user to the first user.

3. The computing system of claim 1, comprising:
upon receiving the connect request inquiry from the second user, allowing the first user to communicate with the second user.

4. The computing system of claim 1, comprising:
enabling the second user to view a profile associated with the first user.

5. The computing system of claim 1, comprising:
enabling the second user to view social network information and/or dating network information in a profile associated with the first user.

6. The computing system of claim 1, wherein a social network information comprises information from: Facebook, Twitter, Instagram, or Linked In, or any combination thereof.

7. The computing system of claim 1, wherein the first user is not notified that the second user has viewed the first user connect request until the second user engages with the first user.

8. The computing system of claim 1, wherein the first user is notified that the second user has viewed the first user connect request.

9. The computing system of claim 1, wherein the connect request associated with the first user is removed after a predetermined period of time when a connection is not established.

10. The computing system of claim 1, wherein the connect request comprises a personal note from the first user to the second user.

11. The computing system of claim 1, wherein location and time information is displayed on the connect application as a pin on a geographical map-based user interface.

12. The computing system of claim 1, wherein the physical hand signal is an ear tug, an L shape gesture made with a pointer finger and a thumb, a temple tap, or any combination thereof.

13. The computing system of claim 1, wherein a connect request answer comprises an image of the second user.

14. The computing system of claim 1, wherein the second user must provide image information and/or name information to the connect application to see a name and/or image of the first user.

15. The computing system of claim 1, wherein the connect application is executed by the processor to use a second user's device to confirm a second user's location and time information.

16. The computing system of claim 1, wherein the second user makes the connect request inquiry at or near a matched location.

17. The computing system of claim 1, wherein a time machine feature is enabled.

18. The computing system of claim 1, wherein the connect request associated with the first user is automatically removed after a connection is established.

19. The computing system of claim 1, wherein the connect application is executed by the processor to automatically identifies the first user location based on a Global Positioning System (GPS) location of the first computing device when the physical hand signal is made.

20. The computing system of claim 1, wherein the connect application is executed by the processor to present a geographical map-based user interface on the first computing device for the first user to search, mark and/or add the first user location when the first user made the physical hand signal or after the first user left a first user location.

* * * * *